United States Patent
Krog

(10) Patent No.: US 10,286,570 B2
(45) Date of Patent: May 14, 2019

(54) SLICER APPARATUS FOR SLICING FOOD ITEMS

(71) Applicant: MAREL SALMON A/S, Stovring (DK)

(72) Inventor: Carsten Krog, Aalborg (DK)

(73) Assignee: MAREL SALMON A/S, Stovring (DK)

( * ) Notice: Subject to any disclaimer, the term of this patent is extended or adjusted under 35 U.S.C. 154(b) by 0 days.

(21) Appl. No.: 16/070,964

(22) PCT Filed: Jan. 20, 2017

(86) PCT No.: PCT/EP2017/051191
§ 371 (c)(1),
(2) Date: Jul. 18, 2018

(87) PCT Pub. No.: WO2017/125551
PCT Pub. Date: Jul. 27, 2017

(65) Prior Publication Data
US 2019/0022887 A1     Jan. 24, 2019

(30) Foreign Application Priority Data

Jan. 22, 2016   (DK) ................................ 2016 70035

(51) Int. Cl.
*B62D 7/00*     (2006.01)
*B26D 7/06*     (2006.01)
(Continued)

(52) U.S. Cl.
CPC ............ *B26D 7/0625* (2013.01); *B26D 1/09* (2013.01); *B26D 5/007* (2013.01); *B26D 5/32* (2013.01); *B26D 7/2628* (2013.01)

(58) Field of Classification Search
CPC ... B26D 7/00; B26D 7/01; B26D 7/08; B26D 7/27
(Continued)

(56) References Cited

U.S. PATENT DOCUMENTS 4,057,875 A * 11/1977 Hill ..................... A22C 17/14
452/112
4,835,817 A * 6/1989 Jurs ..................... A22C 25/17
452/127
(Continued)

FOREIGN PATENT DOCUMENTS

| EP | 0445403 A1 | 9/1991 |
| EP | 2393639 B1 | 4/2015 |
| JP | H0269133 A | 3/1990 |

OTHER PUBLICATIONS

Danish Search Report from DK Application No. PA201670035, dated Jul. 21, 2016.
(Continued)

*Primary Examiner* — Richard T Price, Jr.
(74) *Attorney, Agent, or Firm* — Workman Nydegger

(57) ABSTRACT

A slicer apparatus for slicing food items includes a conveying means for conveying a food item to be cut along a conveying path, where a gap is provided extending across the conveying path; at least one cutting blade. A cutting land is arranged in and along the gap, and the cutting land comprises a recess on at least one side such that during cutting the at least one cutting blade at least partly extends into the recess. A first moving means is connected to the at least one cutting blade for moving the at least one cutting blade in distance relative to the cutting land. A second moving means is connected to the at least one cutting blade for moving the at least one cutting blade angularly relative to the conveying path. A third moving means is connected to the cutting land for adjusting at least an angular position of the cutting land around its longitudinal axis. The third moving means is configured to independently adjust the at least angular position of the cutting land around its longitudinal axis.

15 Claims, 3 Drawing Sheets

(51) Int. Cl.
  *B26D 7/26* (2006.01)
  *B26D 5/32* (2006.01)
  *B26D 5/00* (2006.01)
  *B26D 1/09* (2006.01)

(58) Field of Classification Search
  USPC .................................................. 452/177–179
  See application file for complete search history.

(56) References Cited

U.S. PATENT DOCUMENTS

| | | | | |
|---|---|---|---|---|
| 4,868,951 | A * | 9/1989 | Akesson | A22C 25/12 |
| | | | | 452/155 |
| 5,080,631 | A * | 1/1992 | Howard | A22C 21/0023 |
| | | | | 452/154 |
| 5,094,650 | A | 3/1992 | Schmidt | |
| 5,395,283 | A * | 3/1995 | Gasbarro | A22C 21/00 |
| | | | | 452/117 |
| 8,690,648 | B1 * | 4/2014 | Chu | A22C 21/00 |
| | | | | 452/148 |
| 8,753,177 | B2 * | 6/2014 | Schroder | A22C 17/12 |
| | | | | 452/134 |
| 8,753,179 | B2 * | 6/2014 | Rusko | A22C 25/18 |
| | | | | 452/150 |
| 9,011,213 | B2 * | 4/2015 | Dann | A22C 25/12 |
| | | | | 452/179 |
| 2012/0089244 | A1 | 4/2012 | Weber | |

OTHER PUBLICATIONS

International Search Report and Written Opinion from PCT Application No. PCT/EP2017/051191, dated Apr. 24, 2017.

* cited by examiner (prior art)

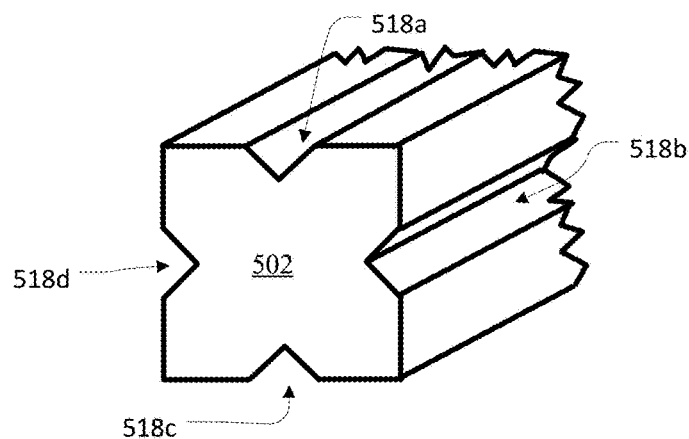
FIG. 5
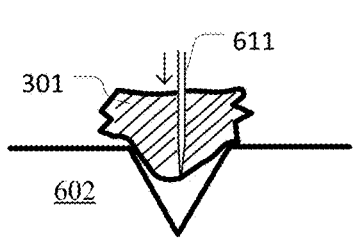 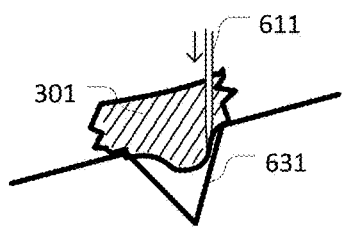
FIG. 6(a)     FIG. 6(b)
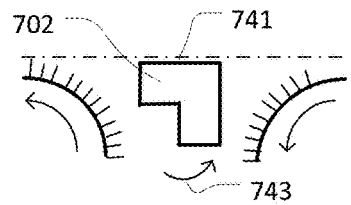 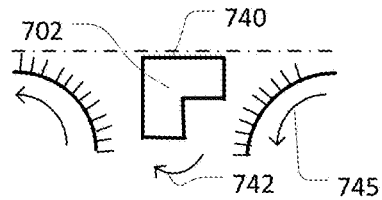
FIG. 7(a)     FIG. 7(b)
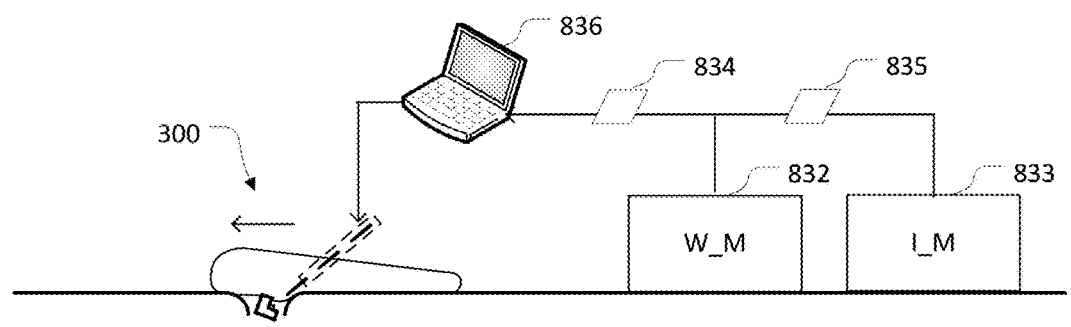
FIG. 8

SLICER APPARATUS FOR SLICING FOOD ITEMS

FIELD OF THE INVENTION

The present invention relates to a slicer apparatus and a system for slicing food items, and to a method of performing the same.

BACKGROUND OF THE INVENTION

EP2393639 discloses a slicer apparatus of the type used for slicing in particular fish fillets, where the apparatus comprises a cutting means arranged in a conveying path, where the cutting means comprises a set of moveable reciprocating knives and a cutting land where the knives are moveable relative to the cutting land and the surface of the conveyor path.

Moreover, the knives and the cutting land are arranged on a common member which member may be rotated through a predetermined arch about a horizontal axis, perpendicular to the conveyor path's transport direction.

The principle of this slicer apparatus is illustrated graphically in FIGS. 1(a) to 1(d) showing where the slicer apparatus is cutting a fish fillet 101 such as a salmon fillet with a reciprocating knife 103 that is moveable in a back and forth direction as indicated by the arrow, where the angular adjustment is utilized to cut the fish fillet into slices of preferably similar size, thickness and weight. The result of such a cutting may e.g. be very thin fish slices as shown in FIG. 2.

However, in several situations this can have some drawbacks and particularly when cutting under shallow angles compared to horizontal carrying surface, e.g. as shown in FIG. 1(d), it can be problematic to obtain the desired cut because the fish fillet may in some cases not have sufficient support from the support surface, i.e. the conveyor system 104, and thus may slide during the cutting under such a shallow angle.

This is partly solved by designing the shape of the cutting land such that it provides a good counter hold effect on the fish fillet when the cutting is performed. Hence, when the knives and the cutting land are turned to a shallower angle, i.e. relative to the conveyor, the cutting land is in a more physical firm contact with the fish fillet. However, this may disturb the conveying of the fish fillet. As an example, the last cut piece 105 of the fish fillet can in some instances be resting on the cutting land 102 since an edge of the cutting land in such a shallow angle position may extend partly above the support surface level, and thus not follow the conveying direction of the remaining cut pieces of this particular fish fillet.

Also, the fish-meat has a tendency to be pulled apart when cutting at such shallow angles compared to when cutting at less shallow angles. When the knife is moved almost perpendicularly through the fish fillet, there is more meat on both sides of the knife to ensure intrinsic meat connection and hence the tendency to pull the meat apart is much less.

SUMMARY OF THE INVENTION

On the above background it is an object of embodiments of the present invention to provide an improved slicing apparatus that overcomes the above mentioned problems.

In general, the invention preferably seeks to mitigate, alleviate or eliminate one or more of the above mentioned disadvantages of the prior art singly or in any combination.

In particular, it may be seen as an object of embodiments of the present invention to provide a slicing apparatus that solves the above mentioned problems, or other problems.

To better address one or more of these concerns, in a first aspect of the invention a slicer apparatus is provided for slicing food items, comprising:
- a conveying means for conveying a food item to be cut, while the food item is conveyed along a conveying path, where a gap is provided extending across the conveying path, at least one cutting blade,
- a cutting land arranged in and along the gap, the cutting land comprising a recess on at least one side such that during cutting the at least one cutting blade at least partly extends into the recess,
- a first moving means connected to the at least one cutting blade for moving the at least one cutting blade in distance relative to the cutting land,
- a second moving means connected to the at least one cutting blade for moving the at least one cutting blade angularly relative to the conveying path, and
- a third moving means connected to the cutting land for adjusting at least an angular position of the cutting land around its longitudinal axis,
- wherein the third moving means is configured to independently adjust the at least angular position of the cutting land around its longitudinal axis.

Accordingly, it is now possible to adjust the angular position between the at least one cutting blade to the different angular positions relative to the cutting land. Thus, the cutting of the slicer apparatus may be greatly enhanced due to the higher flexibility such that the angular adjustment may be automatically set, such that the most optimal cut is obtained. The cutting land may be made of any plastic or plastic like material, or a material that is softer than the material of the at least one cutting blade, such that the cutting blade is not damaged when coming into contact with the cutting land.

In one embodiment, the independent adjustment of the at least angular position of the cutting land around its longitudinal axis comprises instructing the third moving means to a temporarily continuous rotation of the cutting land in a rotational direction identical to a rotation direction of the conveying means so as to facilitate the movement of the food item past the gap. Thus, when cutting e.g. fish fillets, such as a salmon fish fillet, into pieces or slices of e.g. fixed portions, it is ensured that all the cut pieces follow the conveying direction at all times and that the pieces will not stand still on the cutting land or above the gap. Thus, via the temporarily continuous rotation of the cutting land the cutting land acts as a kind of a rotational roller and thus in a way as a conveyor that ensures that all the pieces will follow the previous pieces. This is not only of particular relevance when the pieces are relatively thick slices (pieces) having a thickness of, but not limited to, one or several centimeters, but also when cutting the fish fillet into thin slices within the millimeter range where e.g. the last piece of the fish fillet, sometimes referred to as trim piece, is not so thin and might otherwise stand still on the cutting land or above the gap.

An example of operation is that a control unit receives a signal indicating that the last cut is being performed or has been performed and in response initiates the temporarily continuous rotation of the cutting land. At the latest before a subsequent food item, e.g. fish fillet, arrives, that cutting land has been stopped and is in position where the internal angular position between the cutting land and the at least one cutting blade is correct.

In one embodiment, the independent adjustment of the at least angular position of the cutting land around its longitudinal axis comprises instructing the third moving means, subsequent to performing a cut, to adjust its angular position temporarily such that a side of the cutting land facing the food item forms a substantially horizontal and flat support surface, i.e. it acts as a support for the food item.

This may be performed between each cutting operation via rotation of the cutting land, in a clockwise or counter-clockwise direction, so as to facilitate the advancing of each individual piece over the gap, and/or only after the last cutting operation so as to facilitate the movement of the last piece of the food item.

Thus, the conveying of the cut piece(s) over the gap is thus facilitated since now the substantially horizontal and flat support surface acts in a way as an extension to the support surface of the conveying means.

In one embodiment, the independent adjustment of the at least angular position of the cutting land around its longitudinal axis comprises, during the cutting, to adjust the internal angular position between the cutting land and the at least one cutting blade in accordance to image data from an image device indicating different tissue structure within the food item. Accordingly, when cutting food items such as fish fillets, the slicing apparatus is capable of adjusting the internal angular adjustment between the at least one cutting blade and the cutting land such that areas within the food item that are more difficult to cut can actually be cut, i.e. it is prevented that adjacent pieces or slices hang together after the cut due to insufficient cutting.

The internal angular position may be adjusted by adjusting the angular position of the cutting land, or adjusting the angular position of the at least one cutting blade, or adjusting both the angular positions of the at least one cutting blade and the cutting land.

In one embodiment, the adjustment of the internal angular position between the cutting land and the at least one cutting blade is selected such that the at least one cutting blade at least partly interacts with a side of the recess of the cutting land. This is in particular relevant in the area where the food item contains e.g. tissues that are very difficult to cut. Thus, by making such an adjustment where the at least one cutting blade e.g. squeezes the tissue towards the side of the cutting land, it may be ensured that the cut may be completed such that a complete separation is obtained.

In one embodiment, the at least one cutting blade comprises two reciprocating cutting blades. Such a blade arrangement which is well known to a person skilled in the art is in particular preferred when cutting food items such as fish fillet, e.g. salmon fillets, into slices.

In one embodiment, the first moving means comprises oppositely arranged sliding guides into which the at least one cutting blade is slidably attached, and where at least one actuator is provided for adjusting the distance relative to the cutting land.

In one embodiment, the second moving means is mounted to the first moving means and where the movement of the at least one cutting blade angularly relative to the conveying path is obtained via an angular movement of the first moving means.

In one embodiment, the third moving means comprises an angular adjustment device configured to adjust the angular position in either discrete steps or in a continuous way. This angular adjustment device may in one embodiment comprise any type of a rotor unit or an actuator that is attached to the cutting land, or e.g. attached to a shaft extending along and through the cutting land.

The first to third moving means may comprise any type of actuator, such as, but no limited to, an air cylinder, hydraulics, electric motors and the like.

In one embodiment, the cutting land comprises two or more further recesses, and independent adjustment of at least the angular position of the cutting land around its longitudinal axis comprises adjusting the angular position, such that another recess selected from the two or more further recesses replaces the recess. Thus, when the recess is no longer functioning due to wear and the like (or it may in some other way be destroyed) there will no longer be a need to replace the whole cutting land, but instead the cutting land may be rotated e.g. 90° (depending on the number of such recesses), and be used several times. This is obviously not only more economical and environmental friendly, but also saves time that would otherwise be needed to replace the cutting land. A new recess may also be implemented subsequently to said temporarily continuous rotation of the cutting land where the stopping of the cutting land is at the exact position of the new recess.

In a second aspect of the invention, a method of operating a slicing apparatus is provided, which apparatus comprises a conveying means, at least one cutting blade, a cutting land, a first moving means connected to the at least one cutting blade, a second moving means connected to the at least one cutting blade, and a third moving means connected to the cutting land, wherein the method comprises:

conveying, by the conveyor means, a food item to be cut, while the food item is conveyed along a conveying path, where a gap is provided extending across the conveying path, the cutting land being arranged in and along the gap, the cutting land comprising a recess on at least one side such that during cutting, the at least one cutting blade at least partly extends into the recess, moving, by the first moving means, the at least one cutting blade in distance relative to the cutting land, moving, by the second moving means, the at least one cutting blade angularly relative to the conveying path, and adjusting, by the third moving means, at least an angular position of the cutting land around its longitudinal axis, wherein the adjustment of the angular position of the cutting land is performed independently of the movement of the at least one cutting blade.

In one embodiment, the step of adjusting, by the third moving means, comprises temporarily rotating the cutting land, subsequent to a cut being performed on the food item, in a rotational direction identical to a rotation direction of the conveying means, until the food item has passed the gap and thus has been cut.

In one embodiment, the step of adjusting, by the third moving means, comprises, subsequent to performing a cut, to adjust its angular position temporarily such that a side of the cutting land facing the food item forms a substantially horizontal and flat support surface, i.e. it acts as a support for the food item.

In one embodiment, the independent adjustment of at least the angular position of the cutting land around its longitudinal axis comprises:

acquiring image data of the food item indicating different tissue structure or volume within the food item, adjusting the internal angular position between the cutting land and the at least one cutting blade in accordance to acquired image data.

The acquired image data may e.g. comprise X-ray data, data from a Near Infrared Spectroscopy (NIR) device, data from digital camera showing e.g. colour differences and the like, i.e. any type of data that among other things distinguish between different tissue structures or volumes.

In one embodiment, the method further comprises: acquiring weight related data of the food item, and utilizing the acquired weight data to operate at least the internal angular position between the cutting land and the at least one cutting blade.

In a third aspect of the invention, a slicer system is provided comprising,
a slicer apparatus for slicing food items, which slicer apparatus comprises:
a conveying means for conveying a food item to be cut, while the food item is conveyed along a conveying path, where a gap is provided extending across the conveying path,
at least one cutting blade,
a cutting land arranged in and along the gap, the cutting land comprising a recess on at least one side such that during cutting the at least one cutting blade at least partly extends into the recess,
a first moving means connected to the at least one cutting blade for moving the at least one cutting blade in distance relative to the cutting land,
a second moving means connected to the at least one cutting blade for moving the at least one cutting blade angularly relative to the conveying path, and
a third moving means connected to the cutting land for adjusting at least an angular position of the cutting land around its longitudinal axis,
wherein the third moving means is configured to independently adjust the at least angular position of the cutting land around its longitudinal axis, and
a weight determining means positioned upstream in relation to the slicing apparatus configured to weigh the food item, where the weight related data is used as input data in operating the moving means.

In one embodiment, the slicer apparatus further comprises an imaging device provided upstream in relation to the slicing apparatus to obtain the image data indicating different tissue structure or volume. This image device may e.g. include, but is not limited to, an X-ray apparatus, Near Infrared Spectroscopy (NIR) device, a digital camera and the like. The acquired image data would accordingly be utilized by any type of a control device, e.g. said control device, to operate the slicing apparatus accordingly to ensure the most optimal cuts.

The weight determining means may include any type of weighing device, e.g. a flow scale, a stationary scale, or an X-ray apparatus where the obtained data may be processed to determine the weight of the food item.

In general the various aspects of the invention may be combined and coupled in any possible way within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which
FIG. 5 shows one embodiment of a cutting land,
FIGS. 6(a) and 6(b) depict a zoomed up scenario showing two different angular arrangements between the at least one cutting blade of the slicer apparatus and the cutting land,
FIGS. 7(a) and 7(b) show a zoomed up view of where the angular position of the cutting land is such that the advancement of the food item it facilitated,
and
FIG. 8 shows one embodiment of a slicer system according to the present invention for slicing food products.

DESCRIPTION OF EMBODIMENTS

Figure 1A:
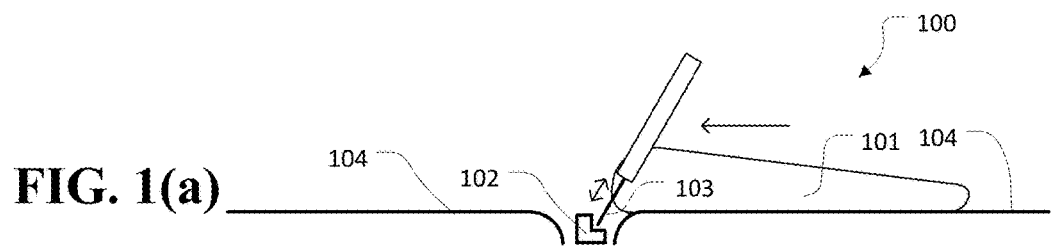
FIGS. 1(a) to 1(d) and 2 show an example of prior art slicer apparatus and slicing results.
Figure 1B:
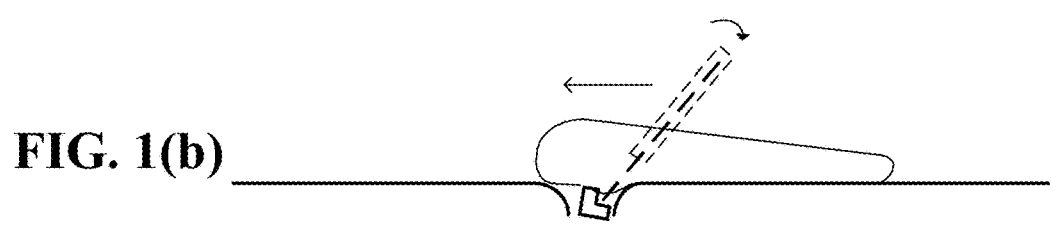
Figure 1C:
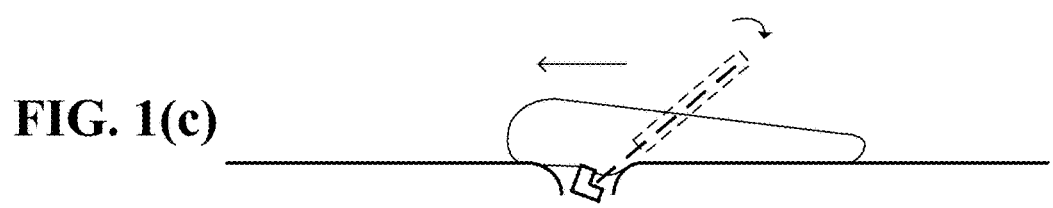
Figure 1D:
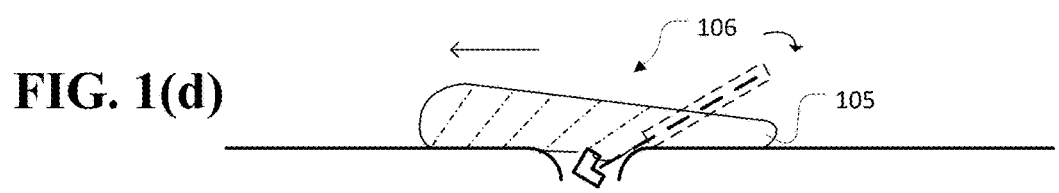
Figure 2:
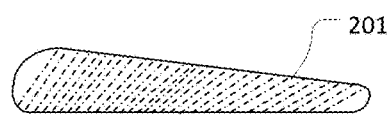
Figure 3:
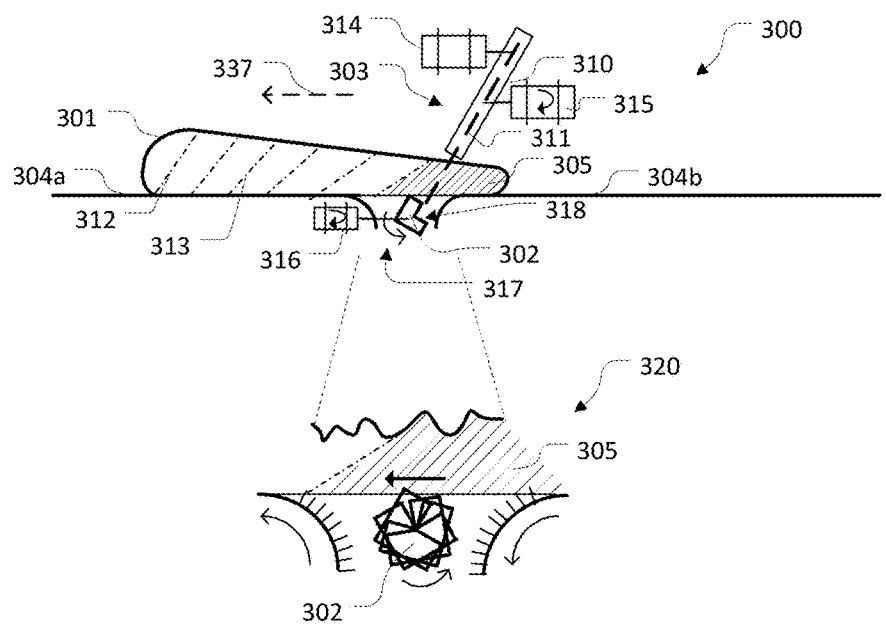
FIGS. 3 and 4(a) and 4(b) show an embodiment of a slicer apparatus according to the present invention.

FIG. 3 shows one embodiment of a slicer apparatus 300 according to the present invention for slicing food items 301 such as fish fillets. The slicer apparatus 300 comprises a conveying means 304a,b, at least one cutting blade 311, a cutting land 302, a first moving means 314 connected to the at least one cutting blade for moving the at least one cutting blade in distance relative to the cutting land, a second moving means 315 connected to the at least one cutting blade for moving the at least one cutting blade angularly relative to the conveying path indicated by arrow 337, and a third moving means 316 connected to the cutting land for adjusting at least an angular position of the cutting land around its longitudinal axis.

The conveying means may in one embodiment comprise a first conveyor 304a and a second conveyor 304b placed end-to-end such that a gap 317 is provided there between extending across the conveying path 337.

A conveyor comprising a single conveyor belt may also be used as a conveying means where such a gap may be provided via a bypass loop of the conveyor belt of the conveyor.

As shown here, the cutting land 302 is arranged in and along the gap, where the cutting land comprising a recess 318 on at least one side such that, during cutting, the at least one cutting blade 311 at least partly extends into the recess.

Moreover, the third moving means 316 is configured to independently adjust the at least angular position of the cutting land around its longitudinal axis. Such an independent adjustment has several advantages, including instructing the third moving means 316 to temporarily rotate the cutting land 302 in a counter clockwise direction as indicated by the arrow, i.e. a rotation direction that is the same as that of the conveyor means 304 so as to facilitate the movement of the food item past the gap.

This is shown in more details in the zoomed up view 320 showing where the cutting land 302 temporarily rotates and acts thus as a kind of a rotating roller onto the cut pieces of the food item, which could be all the cut pieces.

It may also be of relevance to convey the last piece of the food item 305 which thus will follow the previous cut pieces of the same fish fillet. Otherwise, the last piece 305 might be stationary and resting on the cutting land 302 until a next food item arrives and pushes it from the cutting land.

Figure 4A:
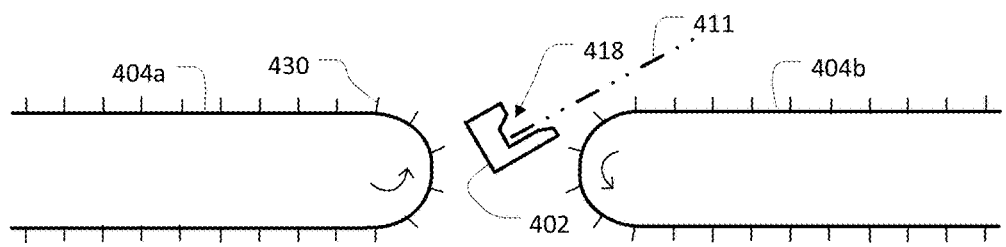
Figure 4B:
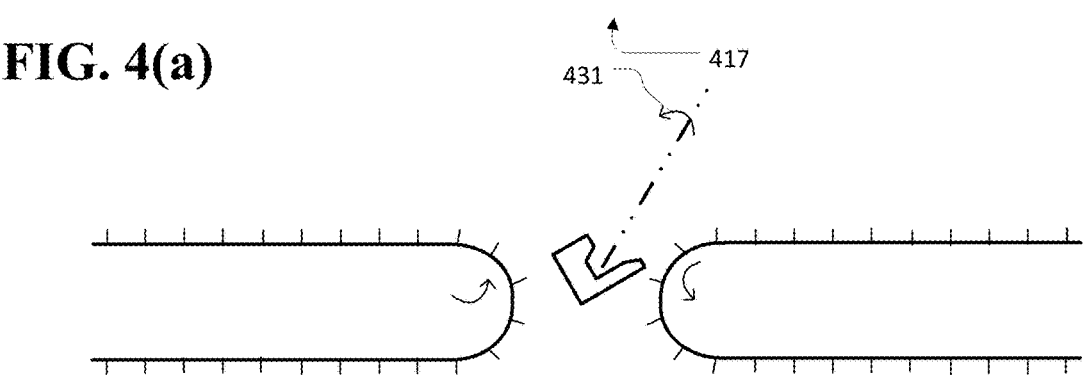

FIGS. 4(a) and 4(b) show an embodiment of a slicer apparatus according to the present invention where the conveyor means comprises a first and a second conveyors 404a,b arranged end-to-end with a gap 417 there between, where the second conveyor 404a is positioned downstream in relation to the first conveyor 404b.

FIG. 4(b) shows where the angular adjustment between the at least one cutting blade 411 and the cutting land 402 has been adjusted compared to the arrangement shown in FIG. 4(a) where such an angular adjustment may be obtained by rotating the cutting land 402 or, as shown here, by means of adjusting the angular position of the at least one cutting blade 411 as indicated by arrow 431. This may be of particular importance when e.g. cutting food items, such as fish fillets, where areas within the fish fillet are more difficult to cut than other areas, i.e. it is prevented that adjacent pieces or slices hang together after the cut due to insufficient cutting.

FIG. 5 shows on example of a cutting land 502 that may be implemented in relation to the cutting apparatus shown in the previous figures. In this embodiment, the cutting land comprises four recesses 518a-518d, such that when one of the recesses does no longer provide the desired effect due to e.g. wear, the cutting land 502 may rotate 90° and thus acts as a multiuse cutting land. The number of recesses should of course not be construed as limited to four recesses. The number of recesses may be two or more, e.g. three, four, five etc.

FIGS. 6(a) and 6(b) depict a zoomed up scenario showing two different angular arrangements between the at least one cutting blade 611 and the cutting land where, similarly as discussed in relation to FIGS. 4(a) and 4(b), the angular position between the at least one cutting blade 611 and the cutting land 602 is different, where e.g. FIG. 6(b) may depict a scenario where the cutting involves cutting areas within the food item that are more difficult to cut and where the physical interaction between the at least one cutting blade 611 and a side 631 of the cutting land is needed to be able to complete the cut such that the adjacent pieces do not hang together.

The shape of the cutting land shown and the at least one recess should of course not be construed as being limited to what is shown here. The recesses, as an example, can have any suitable shape, e.g. a U-shape instead of the V-shape shown here.

FIGS. 7(a) and 7(b) show another advantage of the independent adjustment of the at least angular position of the cutting land around its longitudinal axis, where in this scenario, subsequently to performing a cut, the angular position is adjusted temporarily such that a side 741, 740 of the cutting land facing the food item (not shown) forms a substantially horizontal and flat support surface, indicated by the dotted lines. In FIG. 7(a) the rotational direction of the cutting land 702 is counter clockwise, whereas in FIG. 7(b) the rotational direction is clockwise and opposite to the rotational direction of the conveying means 745.

This may be performed between each cutting operation so as to facilitate the advancing of each individual piece over the gap, and/or only after the last cutting operation so as to facilitate the movement of the last piece of the food item.

FIG. 8 shows an embodiment of a slicer system according to the present invention, where the slicer system comprises a slicer apparatus as shown in FIG. 3, a weighing means (W_M) 832 positioned upstream in relation to the slicing apparatus 300 configured to weigh the food items, where the weight related data 834 is used by a control device 836 as input data in operating the moving means of the slicer apparatus.

The system may also comprise an imaging means (I_M) 833 for imaging incoming food items so as to e.g. determine different types of tissues that may be difficult to cut and based thereon utilize the image data 835 as further input data by the control device in operating the cutting apparatus, e.g. operating the internal angle between the at least one cutting blade and the cutting land.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A slicer apparatus for slicing food items, comprising:
a conveying means for conveying a food item to be cut, while the food item is conveyed along a conveying path, where a gap is provided extending across the conveying path,
at least one cutting blade,
a cutting land arranged in and along the gap, the cutting land comprising a recess on at least one side such that during cutting the at least one cutting blade at least partly extends into the recess,
a first moving means connected to the at least one cutting blade for moving the at least one cutting blade in distance relative to the cutting land,
a second moving means connected to the at least one cutting blade for moving the at least one cutting blade angularly relative to the conveying path, and
a third moving means connected to the cutting land for adjusting at least an angular position of the cutting land around its longitudinal axis,
wherein the third moving means is configured to independently adjust the at least angular position of the cutting land around its longitudinal axis.

2. The slicer apparatus according claim 1, wherein the independent adjustment of the at least angular position of the cutting land around its longitudinal axis comprises instructing the third moving means to a temporarily continuous rotation of the cutting land in a rotational direction identical to a rotation direction of the conveying means so as to facilitate the movement of the food item past the gap.

3. The slicer apparatus according to claim 1, wherein the independent adjustment of the at least angular position of the cutting land around its longitudinal axis comprises, during the cutting, to adjust the internal angular position between the cutting land and the at least one cutting blade in accordance to image data indicating different tissue structure within the food item.

4. The slicer apparatus according to claim 3, wherein adjustment of the internal angular position between the cutting land and the at least one cutting blade is selected such that the at least one cutting blade at least partly interacts with a side of the recess of the cutting land.

5. The slicer apparatus according to claim 1, wherein the independent adjustment of the at least angular position of the cutting land around its longitudinal axis comprises instructing the third moving means, subsequent to performing a cut, to adjust its angular position temporarily such that a side of the cutting land facing the food item forms a substantially horizontal and flat support surface.

6. The slicer apparatus according to claim 1, wherein the first moving means comprises oppositely arranged sliding guides into which the at least one cutting blade is slideably attached to, and where at least one actuator is provided for adjusting the distance relative to the cutting land.

7. The slicer apparatus according to claim 1, wherein the second moving means is mounted to the first moving means and where the movement of the at least one cutting blade angularly relative to the conveying path is obtained via an angular movement of the first moving means.

8. The slicer apparatus according to claim 1, wherein the third moving means comprises an angular adjustment device configured to adjust the angular position in either discrete steps of in a continuous way.

9. The slicer apparatus according to claim 1, wherein the cutting land comprising two or more further recesses and where independent adjustment of the at least angular position of the cutting land around its longitudinal axis comprises adjusting the angular position such that another recess selected from the two or more further recesses replaces the recess.

10. The slicer apparatus according to claim 1, wherein the conveying means comprises an upstream conveyor and a downstream conveyor, where the upstream and downstream conveyors are arranged end-to-end and where the distance there between defines the gap extending across the conveying path.

11. A method of operating a slicing apparatus, which apparatus comprises a conveying means, at least one cutting blade, a cutting land, a first moving means connected to the at least one cutting blade, a second moving means connected to the at least one cutting blade, and a third moving means connected to the cutting land, wherein the method comprises:

conveying, by the conveyor means, a food item to be cut, while the food item is conveyed along a conveying path, where a gap is provided extending across the conveying path, the cutting land being arranged in and along the gap, the cutting land comprising a recess on at least one side such that during cutting the at least one cutting blade at least partly extends into the recess, moving, by the first moving means, the at least one cutting blade in distance relative to the cutting land, moving, by the second moving means, the at least one cutting blade angularly relative to the conveying path, and adjusting, by the third moving means, at least an angular position of the cutting land around its longitudinal axis, wherein the adjustment of the angular position of the cutting land is performed independently of the movement of the at least one cutting blade.

12. The method according claim 11, wherein the independent adjustment of the at least angular position of the cutting land around its longitudinal axis comprises temporarily rotating the cutting land, subsequently to a cut being performed on the food item, in a rotational direction identical to a rotation direction of the conveying means, until the food item has passed the gap and thus has been cut.

13. The method according to claim 11, wherein the independent adjustment of the at least angular position of the cutting land around its longitudinal axis comprises:

acquiring image data of the food item indicating different tissue structure within the food item, adjusting the internal angular position between the cutting land and the at least one cutting blade in accordance to acquired image data.

14. The method according to claim 11, further comprising:

acquiring weight related data of the food item, and utilizing the acquired weight data to operate at least the internal angular position between the cutting land and the at least one cutting blade.

15. A slicer system comprising, a slicer apparatus for slicing food items, which slicer apparatus comprises:

a conveying means for conveying a food item to be cut, while the food item is conveyed along a conveying path, where a gap is provided extending across the conveying path, at least one cutting blade, a cutting land arranged in and along the gap, the cutting land comprising a recess on at least one side such that during cutting the at least one cutting blade at least partly extends into the recess, a first moving means connected to the at least one cutting blade for moving the at least one cutting blade in distance relative to the cutting land, a second moving means connected to the at least one cutting blade for moving the at least one cutting blade angularly relative to the conveying path, and a third moving means connected to the cutting land for adjusting at least an angular position of the cutting land around its longitudinal axis, wherein the third moving means is configured to independently adjust the at least angular position of the cutting land around its longitudinal axis, and a weight determining means positioned upstream in relation to the slicing apparatus configured to weigh the food item, where the weight related data is used as input data in operating the moving means.

* * * * *